July 18, 1944.     V. F. GREAVES     2,353,664
PROGRESSIVE SEPARATOR
Filed May 13, 1940     2 Sheets-Sheet 1
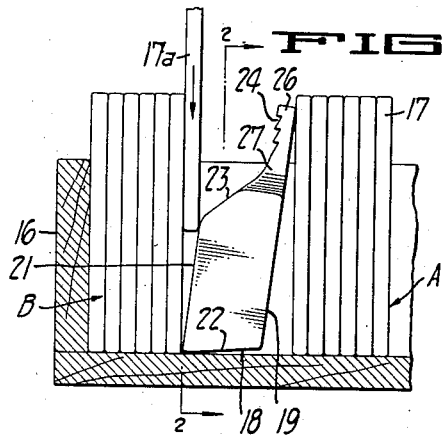
FIG_1_
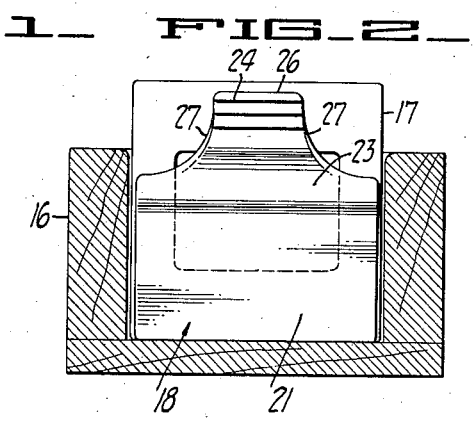
FIG_2_
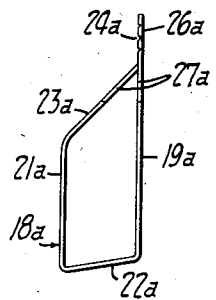
FIG_3_
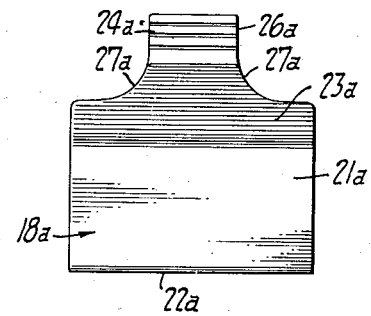
FIG_4_
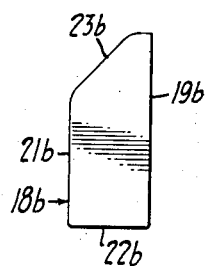
FIG_5_
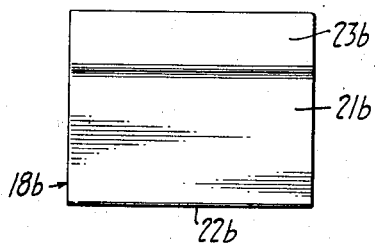
FIG_6_
INVENTOR
Valentine F. Greaves
BY
ATTORNEY July 18, 1944.    V. F. GREAVES    2,353,664
PROGRESSIVE SEPARATOR
Filed May 13, 1940    2 Sheets-Sheet 2
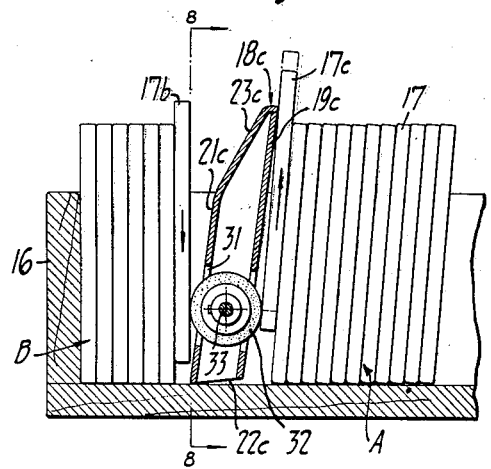
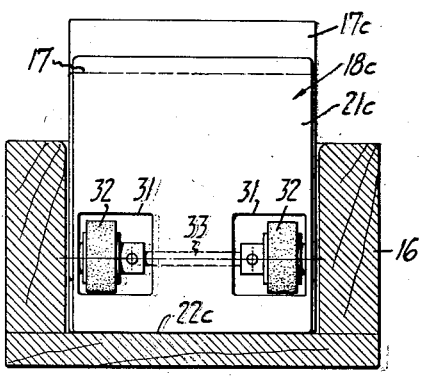
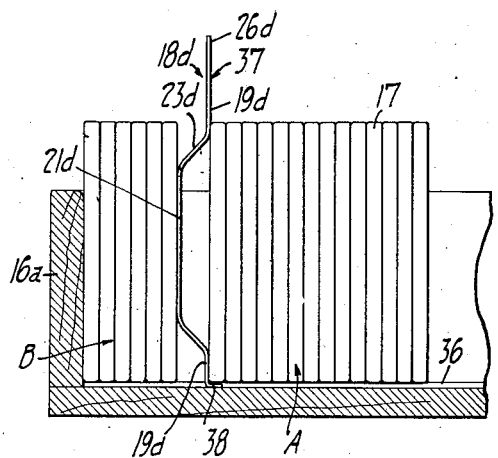
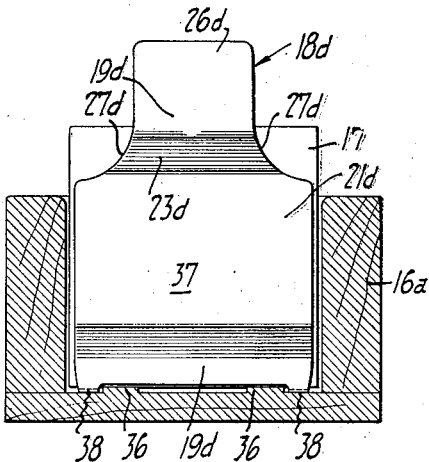
INVENTOR
Valentine F. Greaves
BY Paul D. Flehr
ATTORNEY Patented July 18, 1944

2,353,664

UNITED STATES PATENT OFFICE 2,353,664

PROGRESSIVE SEPARATOR

Valentine F. Greaves, Oakland, Calif.

Application May 13, 1940, Serial No. 334,859

7 Claims. (Cl. 312—42)

This invention relates to equipment for use in the storage and handling of material such as projection slides when arranged in a desired sequence, and is concerned more particularly with the provision of an improved progressive separator whereby the individual slides of a series of sequentially arranged slides can be progressively selected and removed for projection and returned after use to their proper places in the original sequence.

It is an object of the invention to provide improved equipment for facilitating sequential removal and return of slides having a pre-arranged sequence.

Another object of the invention is to provide a progressive separator for use in separating a series of predetermined projection slides into a group to be projected and a group which has been projected, so that the next slide for projection is always readily available and so that the last slide projected can always be readily returned to the series in its correct sequential position.

Another object of the invention is to provide ar improved progressive separator of the character referred to, which enables easy and fool-proof removal and return of slides in conditions of darkness or semi-darkness, and which requires the use of only one hand in removing and returning the slides.

Other objects and advantages of the invention will be apparent from the following description of certain preferred embodiments thereof, as illustrated in the accompanying drawings, in which:

Figure 1 is a fragmentary sectional elevation of a progressive separator construction embodying the invention.

Figure 2 is a transverse sectional view of the construction shown in Figure 1.

Figure 3 is a side elevational view of a modified form of progressive separator.

Figure 4 is a front elevational view of the separator shown in Figure 3.

Figure 5 is a side elevational view of a third form of progressive separator.

Figure 6 is a front elevational view of the separator shown in Figure 5.

Figure 7 is a sectional elevational view of a fourth form of progressive separator.

Figure 8 is a transverse sectional view of the device shown in Figure 7, the view being taken as indicated by the line 8—8 in Figure 7.

Figure 9 is a sectional elevation of a fifth form of progressive separator embodying my invention.

Figure 10 is a transverse sectional view of the progressive separator shown in Figure 9.

As stated above, the present invention is concerned with the provision of means for the handling of a series of projection slides having a prearranged sequence to enable use and return of the slides in the correct sequence during projection. Generally the invention contemplates the provision of means for progressively separating a series of slides into two groups, a group of projected or used slides and a group of to be projected slides. Such progressive separating means in addition provides a guide for the return of used slides in the correct sequence to the used group and selects or makes available the next slide in sequence in the group of slides to be projected. The invention is illustrated as adapted for use with slides of the type commonly employed for "Kodachrome" pictures.

Referring to Figures 1 and 2, a storage box or container of rectangular outline is shown at 16 in which a series of projection slides or frames 17 may be suitably mounted in pre-arranged sequence in row formation. Associated with the projection slides 17 is a progressive separator or partition member indicated generally at 18, which may be formed of any suitable material such as wood, metal, or a plastic. The separator is of a size to be freely insertable in the container and includes parallel side walls 19 and 21 which are joined at the bottom by an inclined bottom wall 22 which preferably forms an obtuse angle with wall 19 and an acute angle with wall 21. The side wall 21 is of less extent than wall 19 and at its upper end merges with an inclined guide wall 23 which terminates in a corrugated surface 24 substantially parallel to the side wall 19. The surface 24 is provided on a handle portion 26 of reduced width which is cut away at either side, as at 27 (see Fig. 2) to expose the corners of an adjacent slide 17.

The side wall 19 is adapted for disposition in contact with the end slide of a group of slides A which are to be projected and against which the side wall 19 is constantly urged by the tilting action of the inclined or stepped bottom wall 22. The cut-away portions 27 of the separator enable grasping of the next slide 17 of the group A to be projected with either the right or the left hand as may be desired.

The inclined guide wall portion 23 above the side wall 21 provides a V-shaped opening with the next slide 17 of the used group of slides B to provide a guide for return of the individual slides after projection. For example, the slide 17a, as seen in Figure 1, can be readily placed in the opening between the separator 18 and the group B, even in the dark, by feel rather than by sight. At the time the slide 17a is pressed downwardly, the separator tends to move into flush engagement with the next adjacent slide of the group A. When this next adjacent slide is removed, the separator 18 will fall against the next slide in sequence by virtue of its tilted position to maintain the guide opening for return of used slides at all times.

In operation, the series of slides 17 are placed in the box 16 with sufficient looseness to allow insertion of the separator 18 at the beginning of the sequence, for example, at the left end of the box as shown in Figure 1. When the projection begins, the operator removes the first slide 17 by grasping a corner thereof exposed by one of the cut-away portions 27. After projection of the slide, it is returned to the box at the other side of the separator 18 which provides a return guide at 23 above side wall 21 and automatically prevents the forming of any opening adjacent the side wall 19 by virtue of its tilting action which maintains the handle portion 24 against the adjacent slide of the group A. This action is repeated as the slides are removed, used and returned sequentially, and it will be noted that the return of the slides after use serves to slide or step the separator along so that it is gradually progressed from one end of the box to the other.

Figures 3 and 4 show a construction generally similar to that described in connection with Figures 1 and 2 but which is formed of sheet metal. Thus a sheet metal blank is formed to provide a side wall 19a, a bottom wall 22a, a second side wall 21a, and an inclined guide wall 23a similar to those found in the type of separator shown in Figure 1. Both the walls 23a and 19a may be cut-away as at 27a to expose the next slide to be projected to the fingers of the operator. Corrugated surface 24a and handle portion 26a of these views correspond to 24 and 26 of Figs. 1 and 2.

Figures 5 and 6 show a third form of separator 18b of the block type wherein the bottom wall 22b is made at right angles to the respective side walls 19b and 21b. At the same time, the height of the block is reduced to substantially the same extent as the cut-away portion, so that the entire top portion of the adjacent slide 17 to be projected is exposed. In use, the separator 18b operates in the same fashion as the separators described above, tending to step along as the slides are returned and removed. If desired, its progressing action may be facilitated by tilting the end of the box adjacent the side 21b to give a tilting action to the separator 18b similar to that provided by the inclined bottom walls 22 and 22a.

Figures 7 and 8 illustrate a progressive separator which in general shape corresponds to those described above but which is additionally provided with means for elevating the next slide to be projected upon return of a projected slide to that group. This type of separator is described and claimed in my co-pending application, Patent No. 2,258,984, granted October 14, 1941.

As seen in Figures 7 and 8, the progressive separator 18c is provided with respective side walls 19c and 21c which are joined at their top by an inclined guide wall 23c. The bottom surface of the operator 18c is inclined, as indicated at 22c to provide a desirable tilting action of the separator toward the next slide to be projected. The height of the separator 18c is in the order of the height of the slides 17 so that upon elevation of a slide to be projected it can be grasped easily by the operator.

The respective side walls 19c and 21c are each provided with a pair of laterally spaced openings 31 through which respective friction rollers 32 project. The rollers 32 may be secured in any convenient manner upon a shaft 33 which is suitably journaled in the end walls of the separator. As seen in Figure 7, the rollers 32 project beyond the respective walls 19c and 21c to engage the adjacent slides of the groups A and B. As seen in Figure 8, the two rollers are spaced apart to engage the slides to either side of the framed opening therein for projection of the picture so that no injury to the actual picture negative or its glass covers can occur.

In operation, when a slide 17b is returned to the group B, as illustrated in Figure 7, it turns the rollers 32 which in turn raise the adjacent slide 17c of the group A. As shown in full lines in Figure 7, the slides 17b and 17c have not completed their movement. When the slide 17b is fully seated in the box, slide 17c will be raised to the dotted line position indicated.

Figures 9 and 10 illustrate a fifth embodiment of the invention wherein means is provided for manually lifting the next slide to be projected at the time the last used slide is returned to the group of projected slides. This form of the invention is disclosed and claimed in my co-pending application, Patent No. 2,258,983, granted October 14, 1941.

As seen in Figures 9 and 10, the box 16a is of modified construction, being provided with a pair of parallel longitudinal rails 36 which may be formed integrally in the box or which may be provided by means of an insert, as desired. The rails 36 serve to maintain the slides 17 elevated above the bottom of the box for a purpose later described.

The progressive separator 18d shown in Figures 9 and 10 comprises a pressed metal plate 37 having wall sections 19d at its upper and lower end portions to engage the adjacent slide of the group A. Intermediate the portions 19d, the plate is offset to form the opposite side wall 21d for engagement with the slides of the group B. Wall 21d at its upper end is joined to the upper section 19d by an inclined guide wall 23d. The wall portions 23d, and upper 19d are cut-away at either side as at 27d to enable grasping of the slides of group A by the operator, and upper portion 19d projects substantially above the slides as at 26d to provide a handle on the separator.

Adjacent its respective ends, the bottom wall section 19d is provided with downward and rearward extensions 38 which form a pair of spaced-apart fingers having a rearward length substantially equal to the thickness of one slide 17 so that when the separator 18d is fully seated against the bottom surface of the box, the fingers 38 can be placed beneath the next adjacent slide 17 of the group B. The engagement of the fingers beneath a slide 17 can be effected manually, or will be effected by return of a slide to the group B because of the progressing action of the separator in response thereto. After engagement of the fingers 38 with a slide, the operator can then grasp the handle 26d and raise this slide in position to be removed for projection.

I claim:

1. A progressive separator for use with a box and a series of projection slides having a pre-arranged sequence in said box, said separator being insertable in the box to separate the slides into a group to be projected and a group which has been projected, said separator being formed adjacent its upper end to lie flush against the group of slides to be projected and to provide a guide opening adjacent the group of slides which have been projected to guide return of a slide which has been projected to the second group as the last slide in the group to maintain the correct sequence of the slides.

2. A progressive separator for use with a box and a series of projection slides having a pre-arranged sequence in said box, said separator being insertable in the box to separate the slides into a group to be projected and a group which has been projected, said separator being formed adjacent its upper end to lie flush against the group of slides to be projected and to provide a guide opening adjacent the group of slides which have been projected to guide return of a slide which has been projected to the second group as the last slide in the group to maintain the correct sequence of the slides, the bottom of said separator being formed to effect tilting of said separator toward said group of slides to be projected.

3. A progressive separator for use with a box and series of projection slides having a pre-arranged sequence in said box, said separator being adapted for disposition in said container to separate the series of slides into a group which are to be projected and another group which have been projected, said separator having one surface formed at its upper portion to lie flush against the next slide of the group to be projected and having its other surface diverging at its upper portion from the adjacent slide of the projected group to define a guide opening leading to said projected group for return of the projected slides in the correct sequence, said separator being progressed along said box in response to removal and insertion of slides.

4. A progressive separator for use with a series of projection slides having a pre-arranged sequence and a container for said series of slides, said separator being adapted for disposition in said container to separate the series of slides into a group which are to be projected and another group which have been projected, said separator having one side surface formed substantially flat at its upper portion to lie flush against the next slide to be projected, the other side surface of said separator being divergent at its upper portion from the adjacent slide of the projecting group to define a guide opening leading to said projected group, and the upper end of said separator being at least partially cut-away to enable manual lifting of the next slide to be projected.

5. A progressive separator for use with a series of projection slides having a pre-arranged sequence and a container for said series of slides, said separator being adapted for disposition in said container to separate the series of slides into a group which are to be projected and another group which have been projected, said separator having one side surface formed substantially flat at its upper portion to lie flush against the next slide to be projected, the other side surface of said separator being divergent at its upper portion from the adjacent slide of the projected group to define a guide opening leading to said group, the bottom of said separator being inclined relative to said side surfaces with the lower edge adjacent the slides of the projected group, and said separator being partially cut-away at its upper end to expose and make available the next slide to be projected.

6. A progressive separator for use with a series of projection slides having a pre-arranged sequence and a container for said series of slides, said separator being adapted for disposition in said container to separate the series of slides into a group which are to be projected and another group which have been projected, said separator being formed from sheet metal to provide a side surface to lie flush against the next slide to be projected, a bottom surface including an angle of more than 90° with said side surface, an opposite side surface forming an angle of less than 90° with said bottom surface, said other side surface having its upper portion bent toward said first side surface to provide a divergent wall with reference to the adjacent slide of the projected group to define a guide opening leading to said projected group.

7. A progressive separator for use with a series of projection slides having a pre-arranged sequence and a container for said series of slides, said separator being adapted for disposition in said container to separate the series of slides into a group which are to be projected and another group which have been projected, said separator having one side surface formed substantially flat at its upper portion to lie flush against the next slide to be projected, the other side surface of said separator being divergent at its upper portion from the adjacent slide of the projected group to define a guide opening leading to said group, and said separator being at least partially cut-away at its upper end to expose and make available the next slide to be projected.

VALENTINE F. GREAVES.